United States Patent [19]
Beaupoil et al.

[11] 3,858,554
[45] Jan. 7, 1975

[54] INDIVIDUAL DEVICE FOR THE PROTECTION OF LOBSTERS OR SIMILAR CRUSTACEANS DURING THEIR GROWTH

[76] Inventors: Claude Marc-Andre Beaupoil, Laboratoire de Biologie marine du College de France, Concarneau; Jean-Francois Hery, 5 square Pasquier, Nantes, both of France

[22] Filed: Sept. 18, 1973

[21] Appl. No.: 398,557

[30] Foreign Application Priority Data
Sept. 18, 1972 France.......................... 72.33015

[52] U.S. Cl. ..................................... 119/2
[51] Int. Cl............................. A01k 61/00
[58] Field of Search................... 119/2, 4, 3

[56] References Cited
UNITED STATES PATENTS
3,601,095  8/1971  Olsson ................................ 119/2
3,685,034  4/1972  Day et al. ............................ 119/2

*Primary Examiner*—Hugh R. Chamblee
*Attorney, Agent, or Firm*—Holman & Stern

[57] ABSTRACT

In an individual protective device for lobsters or similar crustaceans during their growth, a body, heavier than water, pierced with an elongated open cavity having a substantially elliptic cross-section the size of which gradually increases from the bottom of said cavity up to its opening, so that the young lobster or similar crustacean placed at the bottom of said cavity will be maintained in a natural position by said cavity and, during its successive casts of its shell, approach the opening.

8 Claims, 3 Drawing Figures

INDIVIDUAL DEVICE FOR THE PROTECTION OF LOBSTERS OR SIMILAR CRUSTACEANS DURING THEIR GROWTH

BACKGROUND OF THE INVENTION

The invention relates to a device providing for the protection of lobsters during their growth while maintaining them in a dispersed habitat.

The growth of these crustaceans is indeed very slow and it is only after 7 or 8 years that the lobster reaches the legal size for capture after having casted its shell approximately 20 times.

Under natural conditions, as far as young individuals are concerned which, after four life stages in deep water, have become walkers, only 1 to 2.5 percent reach this size for capture required for admittance to fisheries.

When young lobsters, originating from artificial hatcheries and having reached the first walking stages, are immersed in deep water without any protection, it is noted that they are destroyed almost completely by fish before they reach the bottom at 10 to 30 m of the restocking zone.

Although liberated by divers at these very bottoms (costly operation), they are still quite extensively decimated. It is therefore indispensable, in order for stocking operations to become profitable, to provide efficient protection for the young lobsters, at least during their first years of life.

It has been suggested, in order to enhance restocking and protection of young lobsters, to put artificial reefs into place. Results, however, are generally rather disappointing for a dispersed habitat is more favourable.

SUMMARY OF THE INVENTION

The object of this invention is to decrease the rate of natural mortality in lobsters or other similar crustaceans during their growth.

To this effect, the object of the invention is an individual protective device for lobsters or similar crustaceans during their growth, characterized in that it comprises a body, heavier than water, pierced with an elongated open cavity having a substantially elliptic cross-section the size of which gradually increases from the bottom of said cavity up to its opening, so that the young lobster or similar crustacean placed at the bottom of said cavity will be maintained in a natural position by said cavity and, during its successive casts of its shell, approach the opening.

The walls of the cavity are advantageously pierced with holes which are finer at the bottom than at the opening and which are not directly facing one another. These holes are designed to provide for good oxygenation of the cavity and to avoid choking up with mud by causing the water to circulate.

The body is preferably provided with a flat bottom and its center of gravity is located substantially near said bottom, so that the device rests directly and automatically on this base provided to this effect as soon as it reaches the bottom and whatever its position may be upon its introduction in the water. Moreover, the walls may be coated with a film of rich lime, such as tiles used in oyster-breeding for harvesting seed-oysters; this will tend to combat the effect of reducing substances which are harmful to oxygenation (such as sulfides), while providing the animal with calcium which it requires for building a new shell during casting its shell.

The selectivity of the shelter with respect to the lobster is obtained by the actual conformation of the cavity which is unfavourable to conger eels as well as to octopuses and other valueless crustaceans. It can be advantageously increased by coating the internal surface of the cavity with lobster shell powder that has not been calcined; the latter indeed contains a particular protein which, through its contact, favours the lobster's habitation in the shelter.

BRIEF DESCRIPTION OF THE DRAWINGS

The invention will be more fully understood upon reading the following description with reference to the appended drawing in which.

DESCRIPTION OF THE PREFERRED EMBODIMENT

Figure 1:
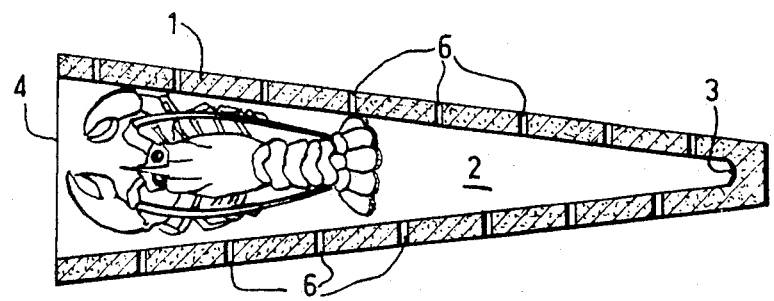
FIG. 1 is a horizontal sectional view of a device according to the invention.
Figure 2:
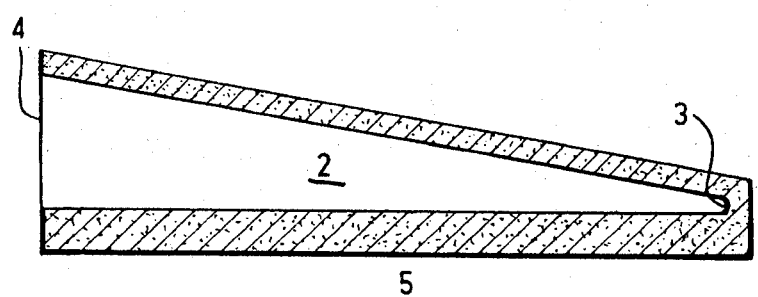
FIG. 2 is a vertical sectional view thereof.
Figure 3:
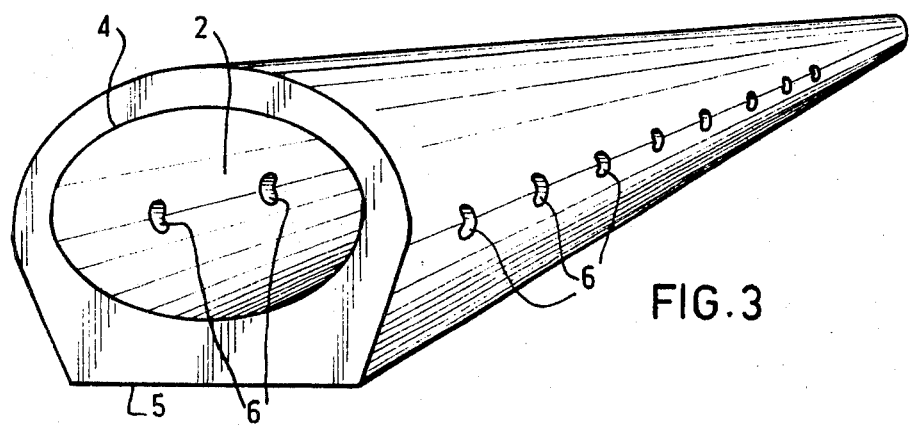
FIG. 3 is a perspective schematic view thereof.

The device according to the invention comprises a body 1, made of hard, heavy or weighted material. Body 1 can, for example, be moulded or cast out of cement or baked clay, glass, plastic, metal, etc. . . Body 1 comprises a bored cavity 2, having a substantially elliptic cross-section gradually increasing in size from the bottom 3 of the cavity up to its opening 4.

Body 1 is provided with a lower plane wall 5 and the thickness of the zone in the body adjacent to that wall is sufficiently great so that the center of gravity of body 1 is close to wall 5.

The lateral walls of cavity 2 are pierced, substantially halfway up, with cross-sectional holes 6 staggered from one wall to the next, the diameter of which increases from the bottom 3 to the opening 4.

Only the dimensions of the cavity in the device according to the invention or habitation are significant; they are connected to the maximum size of the animal which it is desired to see housed therein. According to survival curves, protection up to a size of 5 to 10 cm is the greatest, but it may be anticipated to provide it to a greater size. Expressing the dimensions of the cavity with respect to a reference length $a$ (extremity from the point — extremity of the tail), this length $a$ is to be considered for the largest animal which it is desired to see housed in the habitation. As a non-limiting example of the possible embodiments of the invention, the suggested dimensions are:

Total length of the cavity = 2.4 $a$
at the opening, major axis of the ellipse = 0.6 $a$
minor axis = 0.4 $a$
at 5 cm from the bottom of the cavity, the major axis is 1.8 cm and the minor axis is 1.4 cm These proportions are not limiting but only optimum; the habitation, if more elongated would be more selective, but higher priced. Other modifications of the proportions would render it less selective and would provide less protection.

The device according to the invention may be used for other species of crustaceans such as the American lobster and the edible crab, *Cancer paguras*.

These habitations may be used in three different ways:

a. immersion of the empty habitations, in order to increase the number of suitable shelters for naturally produced young lobsters;

b. immersion of the habitations, each containing a young lobster originating from artificial hatcheries. In this case, the shelter may be temporarily sealed with a strong paper (ex: kraft paper), which will disintegrate in water after several hours so as to allow the setting into place of the habitations from the surface and prevent the escape of the lobster during the descent towards the bottom. These habitations will, in any case, be advantageously dispersed on the suitable gravelly-muddy or sandy-muddy bottoms, which will not exceed several meters in depth below the level of the inland sea.

c. use of these habitations for complete rearing in basins so as to prevent cannibalism.

What we claim is:

1. An individual protective device for lobsters or similar crustaceans during their growth, comprising a hollow body which is heavier than water and has an open end, a closed end, and walls extending between the ends, the walls having internal surfaces which define a substantially conical cavity of a substantially elleptic cross section, the size of the cavity cross section gradually increasing from the closed end to the open end for permitting a crustacean placed in the cavity at the closed end of the body to be maintained in a natural position and to approach the open end of the body during successive casts of the shell of the crustaceans.

2. A device according to claim 1, wherein said walls of said body are pierced with opposed, staggered sets of holes which are finer at said bottom end than at said open end.

3. A device according to claim 2, wherein the body is provided with a flat bottom and its center of gravity is located substantially near said flat bottom.

4. A device according to claim 3, wherein said walls of said body are coated with a film of rich lime.

5. A device according to claim 1, wherein said internal surfaces of said walls are coated with an uncalcined lobster shell powder.

6. A device according to claim 1, wherein the body is provided with a flat bottom and its center of gravity is located substantially near said bottom.

7. A device according to claim 1, wherein the walls of the cavity are coated with a film of rich lime.

8. A device according to claim 1, wherein the internal surface of the cavity is coated with lobster shell powder.

* * * * *